US007017036B2

(12) United States Patent
Fukano et al.

(10) Patent No.: US 7,017,036 B2
(45) Date of Patent: *Mar. 21, 2006

(54) OUTPUT DEVICE WITH ADJUSTABLE OPERATING PARAMETER VALUES VIA HOST COMMANDS

(75) Inventors: Kazuko Fukano, Suwa (JP); Masayo Miyasaka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/094,619

(22) Filed: Mar. 30, 2005

(65) Prior Publication Data

US 2005/0193153 A1 Sep. 1, 2005

Related U.S. Application Data

(63) Continuation of application No. 09/698,778, filed on Oct. 27, 2000, now Pat. No. 6,880,075.

(30) Foreign Application Priority Data

Oct. 29, 1999 (JP) ................................ 11-309954

(51) Int. Cl.
*G06F 9/445* (2006.01)

(52) U.S. Cl. ............................. 713/1; 713/2; 713/100; 711/8; 711/10; 711/104; 710/103; 710/170; 710/173; 358/1.11; 358/1.13; 358/1.15

(58) Field of Classification Search ............... 358/1.11, 358/1.15, 1.13; 711/103, 170, 173; 710/8, 710/10, 104; 713/1, 2, 100

See application file for complete search history.

(56) References Cited

U.S. PATENT DOCUMENTS 4,642,792 A 2/1987 Clements et al.
4,674,037 A 6/1987 Funabashi et al.

(Continued)

FOREIGN PATENT DOCUMENTS

EP 0 685 819 A2 12/1995

(Continued)

*Primary Examiner*—Lynne H. Browne
*Assistant Examiner*—Nitin C. Patel
(74) *Attorney, Agent, or Firm*—Rosalio Haro

(57) ABSTRACT

An output device can be quickly and easily set to the operating parameters required for a particular output process according to data received from a host device. The output device has RAM that temporarily stores the operating parameters, a memory initialization processor that initializes the volatile memory in response to a specific input, a controller that stores operating parameter values for controlling the output device into the RAM in response to one or more first commands from the host device. A second command from the host device causes a first operating parameter controller to save the operating parameters from RAM into a flash ROM. A second operating parameter controller responds to a third command from the host device by storing information into the flash ROM indicative of whether operating parameter data in the flash ROM should be automatically loaded after the memory initialization process. A third operating parameter controller is effective for restoring the operating parameters from flash ROM to RAM after the memory initialization process only when the information in the flash ROM indicates that operating parameter data stored in the flash ROM should be automatically loaded. A particular operating environment defined by the parameters stored in nonvolatile memory can therefore be quickly reset en masse.

20 Claims, 7 Drawing Sheets

U.S. PATENT DOCUMENTS

| | | | |
|---|---|---|---|
| 4,710,886 | A | 12/1987 | Heath |
| 4,845,609 | A | 7/1989 | Lighthart et al. |
| 5,050,098 | A | 9/1991 | Brown, III et al. |
| 5,058,035 | A | 10/1991 | Nagata et al. |
| 5,488,223 | A | 1/1996 | Austin et al. |
| 5,495,559 | A | 2/1996 | Makino |
| 5,500,848 | A | 3/1996 | Best et al. |
| 5,862,310 | A | 1/1999 | Crawford et al. |
| 5,899,614 | A | 5/1999 | Maeda et al. |
| 5,933,656 | A | 8/1999 | Hansen |
| 6,006,039 | A | 12/1999 | Steinberg et al. |
| 6,035,346 | A | 3/2000 | Chieng et al. |
| 6,038,375 | A | 3/2000 | Makino |
| 6,134,606 | A | 10/2000 | Anderson et al. |
| 6,173,412 | B1 | 1/2001 | Isozaki et al. |
| 6,178,004 | B1 | 1/2001 | Ochiai |
| 6,253,281 | B1 | 6/2001 | Hall |
| 6,501,562 | B1 | 12/2002 | Nakagiri et al. |
| 2002/0048045 | A1 | 4/2002 | Umezawa et al. |

FOREIGN PATENT DOCUMENTS

| | | |
|---|---|---|
| JP | 8-69362 | 3/1996 |

102

OUTPUT DEVICE WITH ADJUSTABLE OPERATING PARAMETER VALUES VIA HOST COMMANDS

CONTINUING APPLICATION DATA

This application is a continuation of Ser. No. 09/698,778, filed Oct. 27, 2000 now U.S. Pat. No. 6,880,075, the contents of which is incorporated herein by reference.

BACKGROUND OF THE INVENTION

1. Field of the Invention

The present invention relates to an output device, a control method for the output device, and to a data storage medium for recording a computer-executable program implementing the steps of the control method. More particularly, the present invention relates to technology for quickly and easily changing the operating parameter settings of an output device.

2. Description of the Related Art

Printers, displays, and other output devices output by printing or presenting on a display monitor text and images contained in control commands and data input to the output device from a host device. The host device (referred to as simply host below) specifies values or settings of operating parameters such as the language code (JIS, ASCII, Unicode, or others), font, character and image size, and line spacing, and the output device then outputs the text and images based on the specified parameter values.

The output device typically stores these various parameter values as an operating environment in a predetermined area of RAM (Random Access Memory), and retrieves required parameter values from the RAM when the text or image data is processed for output. When output device power is turned on or the output device is reset, the operating parameters are set to default values by an initialization program. For the host device to set any particular parameter to a desired value, it must send a parameter setting command to the output device.

This means that if a default value of the output device differs from a value preferred by the host, the host must send the parameter setting command to the output device every time output device power is turned on or the output device is reset.

Some application programs (referred to as simply applications below) that run on the host also issue, during the application startup process, an initialization command that restores these operating parameters to the default values, and then after the application is running send another command to set the output device to a certain operating environment, that is, set the parameters to the values required by the application. This is because by restoring the operating parameters temporarily to their default values, the application only needs to send commands to change those of the parameters whose value should be different from the respective default value, and can thereby reduce, even if just slightly, the amount of data to be transmitted. Even with this method, however, the host needs to send a large amount of data to the output device to change the output device settings.

We should also note that Japanese Unexamined Patent Application Publication (Kokai) 8-69362 teaches an output device that saves, as part of the shutdown process performed when power is turned off, the operating environment settings stored in RAM to an external nonvolatile memory. When the power is turned on, the output device checks whether the external nonvolatile memory is present and, if so, whether operating environment settings are stored in the nonvolatile memory. If such settings are stored and a restoration command is received from the host, the output device copies these saved settings from the nonvolatile memory back to the RAM.

Many applications for point of sale (POS) systems, in particular, send an initialization command to the output device at each transaction (for example, printing one receipt) in order to ensure reliable output; the operating parameters must therefore be reset to the desired values at each transaction. A problem arises in the context, when the communications rate between the host and output device is slow, a situation that is quite common. Because a large amount of data must be sent from the host to change a particular operating parameter to a desired value, a relatively long period of time is required to set the output device to the desired operating environment. It is therefore particularly desirable to have an output device that can easily set the operating parameters at high speed.

Furthermore, a single output device is often shared by plural applications. It is therefore also desirable to have an output device that can be quickly set to the operating parameters of a particular application.

OBJECTS OF THE INVENTION

With consideration for the above noted problems of the related art, an object of the present invention is to provide an output device in which operating parameters can be quickly set to desired values. A further object is to provide a control method for this output device, and further to provide a data storage medium for recording a program achieving this control method.

SUMMARY OF THE INVENTION

To achieve this object, an output device according to the present invention that operates according to data received from a host device has volatile memory that temporarily stores operating parameters; a memory initialization processor that initializes the volatile memory in response to a specific input; a controller that stores operating parameter values into the volatile memory in response to one or more first commands from the host device and controls the output device based on the operating parameters stored in volatile memory; a first operating parameter controller that saves operating parameter data stored in volatile memory to a nonvolatile memory in response to a second command from the host device (where the operating parameter data comprises one or more operating parameter values); a second operating parameter controller that stores specific information into the nonvolatile memory in response to a third command from the host device (where the specific information is indicative of whether operating parameter data stored in the nonvolatile memory is automatically loaded after the memory initialization process); and a third operating parameter controller that automatically copies the operating parameter data from the nonvolatile memory to the volatile memory after the memory initialization process only when the specific information indicates operating parameter data stored in the nonvolatile memory is automatically loaded. Because the parameter values, which define a desired operating environment and are set in the working area of a volatile memory, can be saved to a nonvolatile memory intentionally in response to a corresponding command from the host, the saved operating parameter values can be read as needed to quickly restore the same operating environment.

In the above case, it is preferred that the third operating parameter controller be further adapted to copy operating parameter data from the nonvolatile memory to the volatile memory in response to a fourth command from the host device. Also, the specific input is preferably one of the power to the output device being turned on, a reset signal to reset the output device, or an initialization command from the host device.

The nonvolatile memory preferably has a plurality of areas for storing operating parameters, the first operating parameter controller stores operating parameter data to one of the plurality of areas specified by the second command, and the third operating parameter controller stores to volatile memory operating parameter data from one of the plural areas in nonvolatile memory as specified by the specific information. In this case plural sets of operating environment parameters can be saved, and the desired set can be read and reset as needed.

Further preferably, the third operating parameter controller is further adapted to copy the set of operating parameter data stored in a specific one of the parameter memory areas from the nonvolatile memory to the volatile memory in response to a fourth command from the host device, which also specifies the parameter memory area. Alternatively, the third operating parameter controller may be adapted to write predetermined default operating parameter data into the volatile memory when no operating parameter data is stored in the nonvolatile memory. Also, the third operating parameter controller may be responsive to a fifth command from the host device for writing predetermined default operating parameter data into the volatile memory.

Additionally, the output device may further include a transmitter that reads operating parameter data stored in the nonvolatile memory and sends the read data to the host device in response to a sixth command from the host device.

In an alternate approach to the present invention, an output device operates according to data received from a host device, and has volatile memory that temporarily stores operating parameters; a memory initialization processor that initializes the volatile memory in response to a specific input; a first controller that stores operating parameter values into the volatile memory in response to one or more first commands from the host device and controls the output device based on the operating parameter values stored in the volatile memory; and a second controller that performs one of the following operations in accordance with a parameter of a second command from the host device: (i) saves operating parameter data stored in the volatile memory to a nonvolatile memory, where the operating parameter data includes one or more operating parameter values: (ii) stores specific information into the nonvolatile memory, where the specific information is indicative of whether operating parameter data stored in the nonvolatile memory should be automatically loaded after the memory initialization process. In the present output device, the controller is preferably adapted to automatically copy the operating parameter data from the nonvolatile memory to the volatile memory after the memory initialization process only when said specific information indicates that operating parameter data stored in the nonvolatile memory should be automatically loaded. Also in the present output device, the second controller is preferably adopted to (iii) copy the operating parameter data stored in the nonvolatile memory to the volatile memory.

In the present case, as in the previous case, the specific input is preferably one of the power to the output device turning on, a reset signal to reset the output device, or an initialization command from the host device.

Additionally in the present case, the nonvolatile memory has a plurality of parameter memory areas for storing respective sets of operating parameter data, and the second controller is adapted to save operating parameter data from the volatile memory into one of the parameter memory areas specified by the second command. Preferably, the second controller is adapted to copy the operating parameter data stored in one of said parameter memory areas from the nonvolatile memory to the volatile memory after the memory initialization process. In this case, the copied parameter memory area is specified by said specific information.

Preferably, the nonvolatile memory has a plurality of parameter memory areas for storing respective sets of operating parameter data, and the second controller is adapted to copy the operating parameter data stored in a selected one of the parameter memory areas from the nonvolatile memory to the volatile memory in accordance with the parameter of the second command, where the selected parameter memory area is specified by the second command.

Additionally in this alternate approach, the second controller is preferably adapted to write predetermined default operating parameter data into the volatile memory when no operating parameter data is stored in the nonvolatile memory.

The second controller is preferably further adopted to (iv) write predetermined default operating parameter data into the volatile memory. Additionally, the second controller may be further adopted to (v) read operating parameter data stored in the nonvolatile memory and send the read data to the host device.

In still an alternate embodiment of the present invention, an output device is adapted to operate according to data received from a host device, and the output device includes: a volatile memory that temporarily stores operating parameter values; a memory initialization processor that initializes the volatile memory in response to a specific input; and a controller that stores operating parameter values into the volatile memory in response to one or more first commands from the host device and controls the output device based on the operating parameter values stored in the volatile memory. In the present case, the controller is preferably effective for: being responsive to a second command from the host device for saving operating parameter data stored in the volatile memory to a nonvolatile memory, where the operating parameter data includes one or more operating parameter values; being responsive to a third command from the host device for storing specific information into the nonvolatile memory, where the specific information is indicative of whether operating parameter data stored in the nonvolatile memory is automatically loaded after the memory initialization process; and being adapted to automatically copy the operating parameter data from the nonvolatile memory to the volatile memory after the memory initialization process only when said specific information indicates operating parameter data stored in the nonvolatile memory is automatically loaded. In this embodiment, it is preferred that the controller be further responsive to a fourth command from the host device for copying the operating parameter data from the nonvolatile memory to the volatile memory.

Other objects and attainments together with a fuller understanding of the invention will become apparent and appreciated by referring to the following description and claims taken in conjunction with the accompanying drawings.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

A preferred embodiment of the present invention is explained below with reference to the accompanying figures. It will be noted that the following description of the present invention is only illustrative of the invention and shall not limit the scope of the accompanying claims. It will therefore be evident to one with ordinary skill in the related art that numerous variations will be possible by replacing any or all of the elements of the invention with an equivalent, and that all such variations are also included in the scope of the present invention.

First Embodiment

Figure 1:
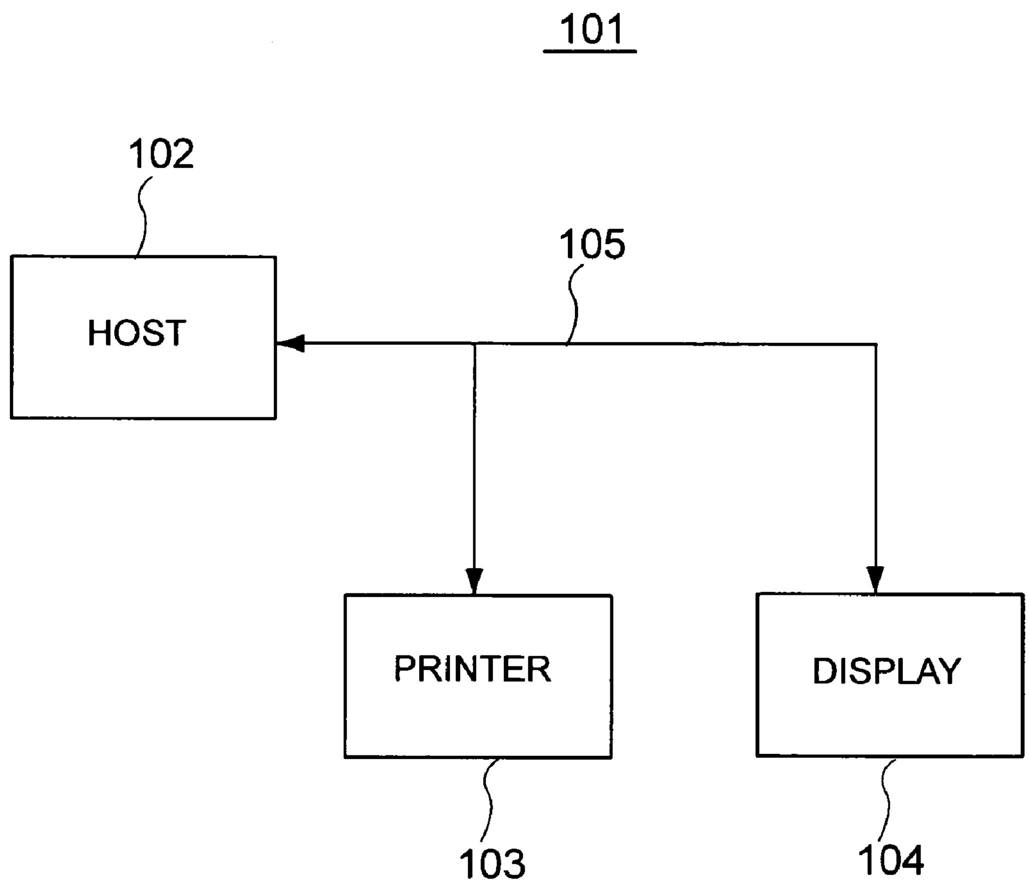
FIG. 1 is a schematic diagram showing the configuration of an output system according to a preferred embodiment of the present invention.

As shown in FIG. 1, a schematic diagram showing the configuration of an output system 101 according to a preferred embodiment of the present invention, output system 101 includes a host 102, a printer 103, and a customer display 104, the three devices being interconnected by a communications bus 105.

Data sent by host 102 is received by printer 103 and display 104 by way of communications bus 105. Data sent by host 102 includes control commands and print or display data for output.

The printer 103 and display 104 are each assigned a unique identification number, referred to below as a device ID. The host 102 is thus able to select a particular output device for which the transmitted output data is valid by specifying this device ID in a device selection command preceding the output data. When the printer 103 or display 104 determines from this device selection command that it has been selected, it runs a process appropriate to the received data, and otherwise (that is, if the printer 103 or display 104 determines the data was not sent to itself) ignores the received data.

It will also be evident that instead of using a device selection command a particular device can be alternatively selected by providing a device selection parameter for specifying the device ID in the command or print data. It is further possible to use a different command code for each device even for commands having the same function.

The host 102 can thus print or display a desired text or image on a selected output device by selecting the particular device using a device selection command, and then following that command with the ASCII codes of the text, for example, to be printed or displayed.

Likewise, the host 102 can set each device to a particular operating environment by asserting a particular parameter setting command. Some operating parameters that can be set using this parameter setting command are shown below by way of example only. It should be noted that the following parameters include some that are valid for both printer 103 and display 104, and others that are only valid for either printer 103 or display 104.

- character font for printing or display selection
- international character set selection
- character code table selection (extended symbols (ASCII 80h to FFh, for example))
- character size for printing or display selection
- set or clear character style(s) for printing or display (including underline, bold, inverse, italic, rotated, enlarged, reduced)
- select print/display mode(s)
- set print/display area
- left margin setting
- line spacing setting
- horizontal tab positions setting
- specify, cancel, define, or delete a user-defined character set
- downloaded bit image definition
- macro definition
- enable/disable automatic status back (ASB) function When one of the above parameters is set by means of the appropriate parameter setting command, printer 103 or display 104 stores the setting to local RAM for reference and use when text or image data is processed for printing or display.

The host 102 can also clear all parameters to the default values of the printer 103 or display 104 by sending an initialization command.

It will be evident to one with ordinary skill in the related art that while there are two output devices, specifically printer 103 and display 104, connected to the single host 102 in the output system 101 shown in FIG. 1, variations having one or more output device(s) connected to the host 102 are also within the scope of the present invention and the accompanying claims.

1. Printer Configuration

Figure 2:
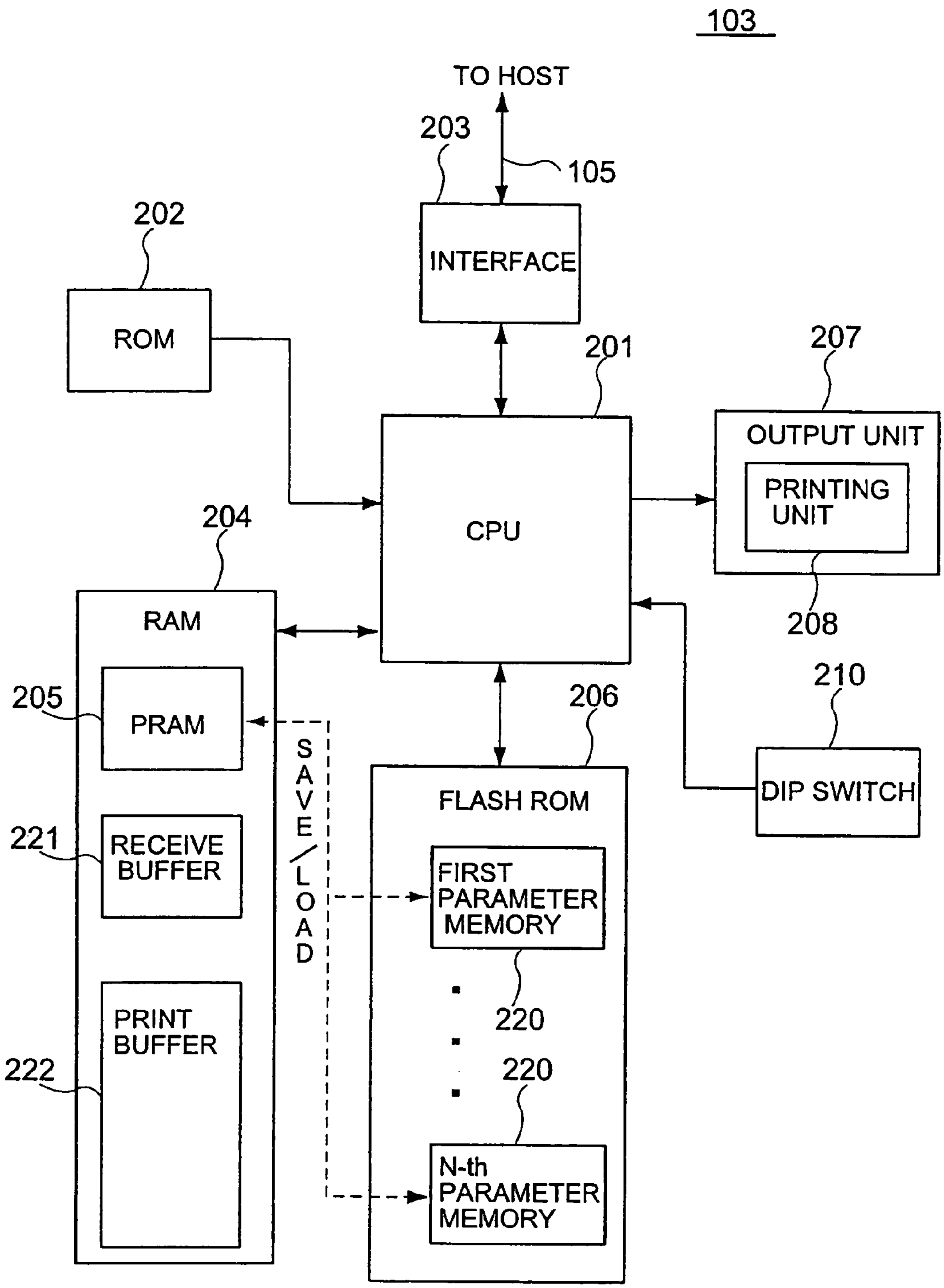
FIG. 2 is a schematic diagram showing the configuration of the printer 103 in the output system shown in FIG. 1.

FIG. 2 is a schematic diagram of the printer 103 shown in FIG. 1. In this printer 103, CPU 201 controls various parts of printer 103 according to a program stored in ROM 202. CPU 201 runs an initialization process when printer 103 power is turned on. The details of this initialization process vary according to the settings of DIP switches 210. It should be noted that ROM 202 also stores a font definition for at least one text font.

The printer 103 communicates with host 102 by way of interface 203. When data is received from the host 102, interface 203 issues an interrupt to CPU 201, and CPU 201 thus runs an interrupt process. This interrupt process sequentially stores the received data to a receive buffer 221 in RAM 204.

In the normal control process, CPU 201 sequentially reads and interprets data stored in receive buffer 221 to detect a command or print data contained in the buffered data, and then run the corresponding process. As noted above, among others, this process may be a process for setting the operating parameters of printer 103, and a process for printing text or image data.

The parameter values of printer 103 are stored in a parameter RAM area (PRAM) 205 area set-aside in RAM 204. Printer 103 has a function for saving the parameter values in PRAM 205 to a parameter memory area (PMA) 220 in flash ROM 206 or other type of nonvolatile memory when host 102 sends a particular command, referred to below as the customization command, to the printer 103. Printer 103 also has a function for restoring the parameter values saved to PMA 220 to PRAM 205. One or more PMAs 220 can be reserved in flash ROM 206, i.e., there are N parameter memory areas 220 where N>=1. The customization command is further described in detail below.

When the received data is text or image print data, a bit image of the image or text font information is generated in a print buffer 222 (which is a line buffer or page buffer) in RAM 204. The parameter values stored in PRAM 205 are referenced to generate the print image. The printing unit 208 of output unit 207 is then driven to print the print image in print buffer 222 in line or page units on the printing medium, which could be paper, film, or other medium.

2. Display Configuration

Figure 3:
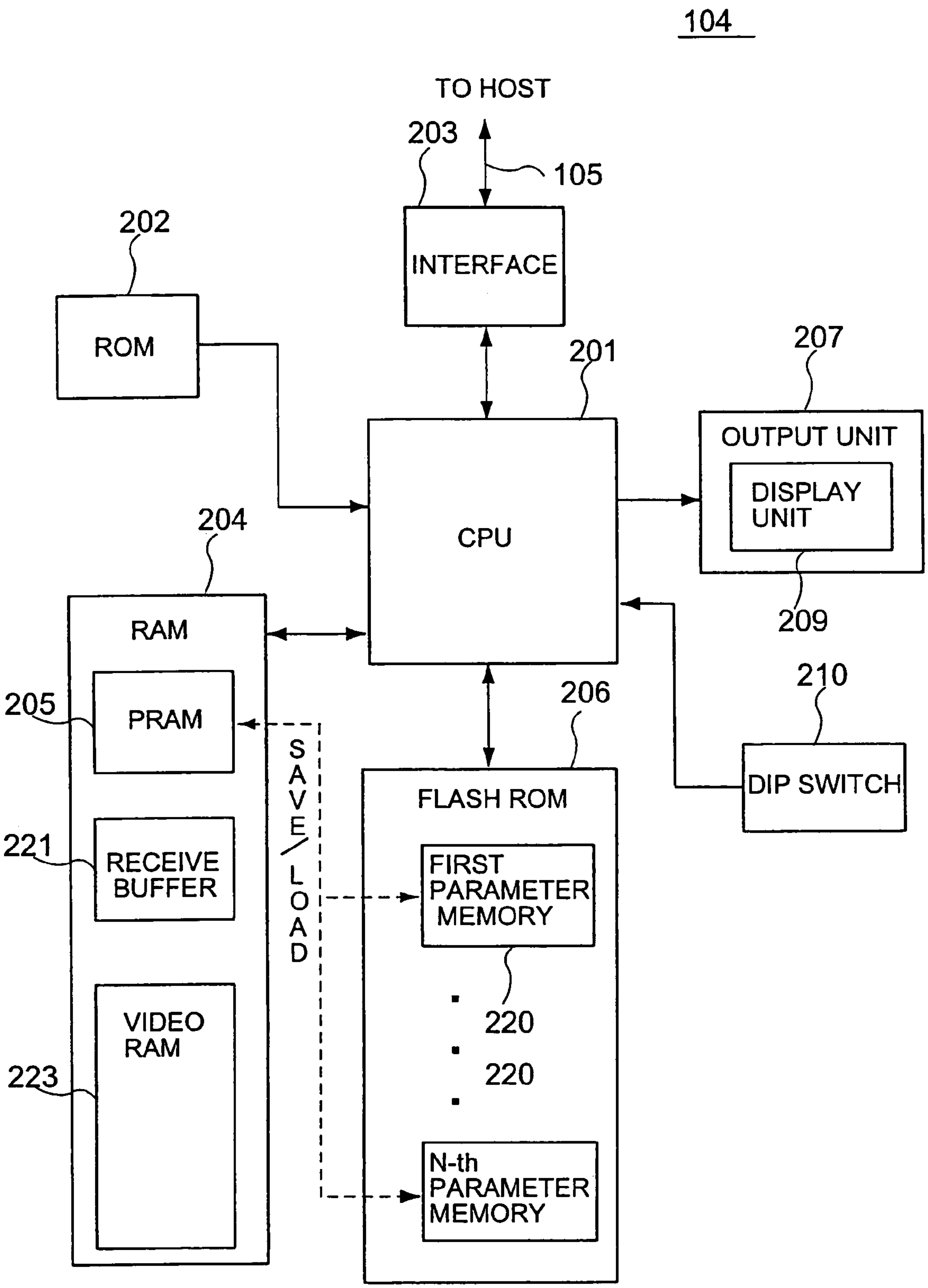
FIG. 3 is a schematic diagram showing the configuration of the display 104 in the output system shown in FIG. 1.

FIG. 3 shows the configuration of the display 104 shown in FIG. 1. It will be evident from FIG. 2 and FIG. 3 that printer 103 and display 104 are both output devices and differ only in the text or image output method, that is, they differ only in whether the text or image information is printed on a printing medium or presented on some sort of display monitor. The basic configuration of printer 103 and display 104 is therefore essentially the same with respect to the functional blocks that relate to the present invention. Like parts in printer 103 and display 104 are therefore shown with like reference numerals, and further description thereof is omitted below.

The output unit 207 of display 104 is an LCD panel or other display unit 209.

Furthermore, video RAM 223, which is equivalent to the print buffer 222 of printer 103, is provided in RAM 204 in display 104. A bit-mapped image of the image or text font information to present is generated in video RAM 223. The data stored in video RAM 223 is then sent to display unit 209 for presentation thereon at the appropriate timing, for example, as determined by the vertical sync signal.

3. Customization Command

An exemplary customization command is formatted as shown below. Note that 0x indicates hexadecimal notation.

–0×1d 0×28 0×4d pL pH n m: printer customization command

–0×1f 0×28 0×4d pL pH n m: display customization command

Note that n and m are each a one byte command parameter, and pL and pH are bytes (pL+pH*256) indicating the number of command parameters that follow. In this example with two command parameters n and m, pL=0×02 and pH=0×00.

Command parameter n specifies a function code; if n=1, operating parameter values in PRAM 205 are saved to PMA 220 in flash ROM 206, and if n=2, parameter values are restored to the saved ones. Command parameter m specifies a particular PMA 220. The parameter values are thus saved to, or restored from, the PMA 220 addressed by the value passed as parameter m.

4. Output Device Processes

Figure 4:
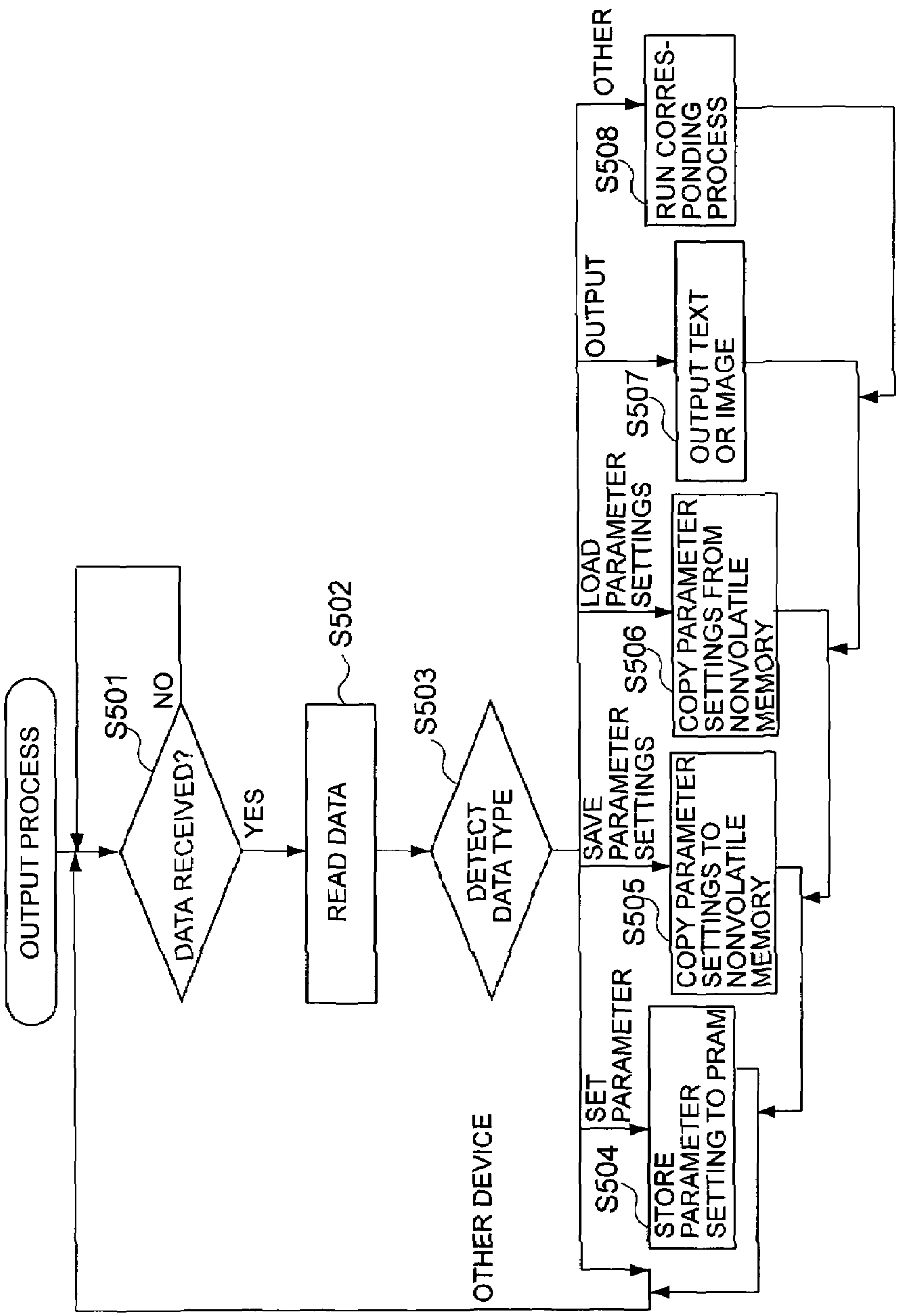
FIG. 4 is a flow chart of the control process run by an output device according to a first preferred embodiment of the present invention.

FIG. 4 is a flow chart of the output process used by an output device according to the present invention, such as printer 103 and display 104. It should be noted that this output process is described below using the printer 103 by way of example only, and that display 104 (or any other output device) performs the same or substantially the same process.

CPU 201 first detects whether data has been received from host 102, that is, whether data has been stored to receive buffer 221 in RAM 204 (S501). If receive buffer 221 is empty (S501 returns no), the procedure loops back to S501, and thus waits until data is received. CPU 201 can evidently perform other processes while waiting for data to be received to receive buffer 221. For example, if a receive interrupt is generated while in this standby state, data will be stored in receive buffer 221 by the interrupt process.

If receive buffer 221 is not empty (S501 returns yes), CPU 201 reads the data from receive buffer 221 (S502). The receive buffer 221 is typically a ring buffer or queue, and the read data is thus deleted from receive buffer 221.

CPU 201 then detects the type of data read (S503). If the data is intended for an output device other than printer 103, e.g., if another output device has been selected by a device selection command (S503 detects "other device"), the procedure loops back to S501.

If the data read from receive buffer 221 is a parameter setting command (S503 detects a parameter setting), the value is stored at the address in PRAM 205 corresponding to the indicated command (S504), and the procedure loops back to S501. For example, if the received command is a line feed setting command having a parameter q defining the line feed distance, the value of parameter q is stored in PRAM 205.

If a customization command is received and function code n is set to 1 (S503 returns save parameters), the values stored in PRAM 205 are copied to the appropriate PMA 220 and are thus statically saved (S505). More particularly, the parameters are copied to the m-th PMA 220 in flash ROM 206 as specified by parameter m in the customization command. If the value of m is not valid, an appropriate error handling process is run or the command is simply ignored. When parameter copying is completed, the procedure loops back to S501.

If the value of a parameter stored in RAM 204 equals the value of the same parameter already stored in PMA 220, it is preferable to not copy this same value to the flash ROM again. This is because the number of times flash ROM 206 can be written is limited, and it is therefore desirable to minimize the number of writes performed.

Furthermore, depending on the type of printer 103, printer 103 may not have enough storage capacity to save all parameter values in PMA 220. In such cases it is preferable to pre-select which operating parameters can be saved. For example, settings associated with functions required by the application, or needed to set large amounts of data such as downloaded bit images, might be preferably selected.

If a customization command is received and function code n is set to 2 (S503 returns load parameters), the values stored in PMA 220 are copied to PRAM 205(S506). In this case, the parameters are copied from the m-th PMA 220 as specified by parameter m in the customization command. Operations for restoring to and saving from PRAM 205 thus correspond to each other. If nothing is stored in the PMA 220 specified by parameter m, some other specified values (such as the default values set when power is turned on) are written in, or copied to, PRAM 205. These other specified values are also written in, or copied to, PRAM 205 if m=0. If the value of m is not valid, an appropriate error handling process is run or the command is simply ignored. When parameter copying is completed, the procedure loops back to S501.

If parameter values that can be saved and loaded as described above are written to consecutive addresses in PRAM 205, plural values can be easily copied from the consecutive addresses. If this is not the case, however, the values must be individually selected and copied for the save and loading operations.

If print data is received (S503 returns output), a print image of the text font data or graphic is generated in print buffer 222, and output unit 207 is appropriately driven to print the text or image on the printing medium using the print head (S507), and the procedure loops back to S501.

If some other command is received and read from the receive buffer (S503 returns "other"), the corresponding process is run (S508) and the procedure loops back to S501.

5. A Preferred Embodiment of the Host Device

Figure 5:
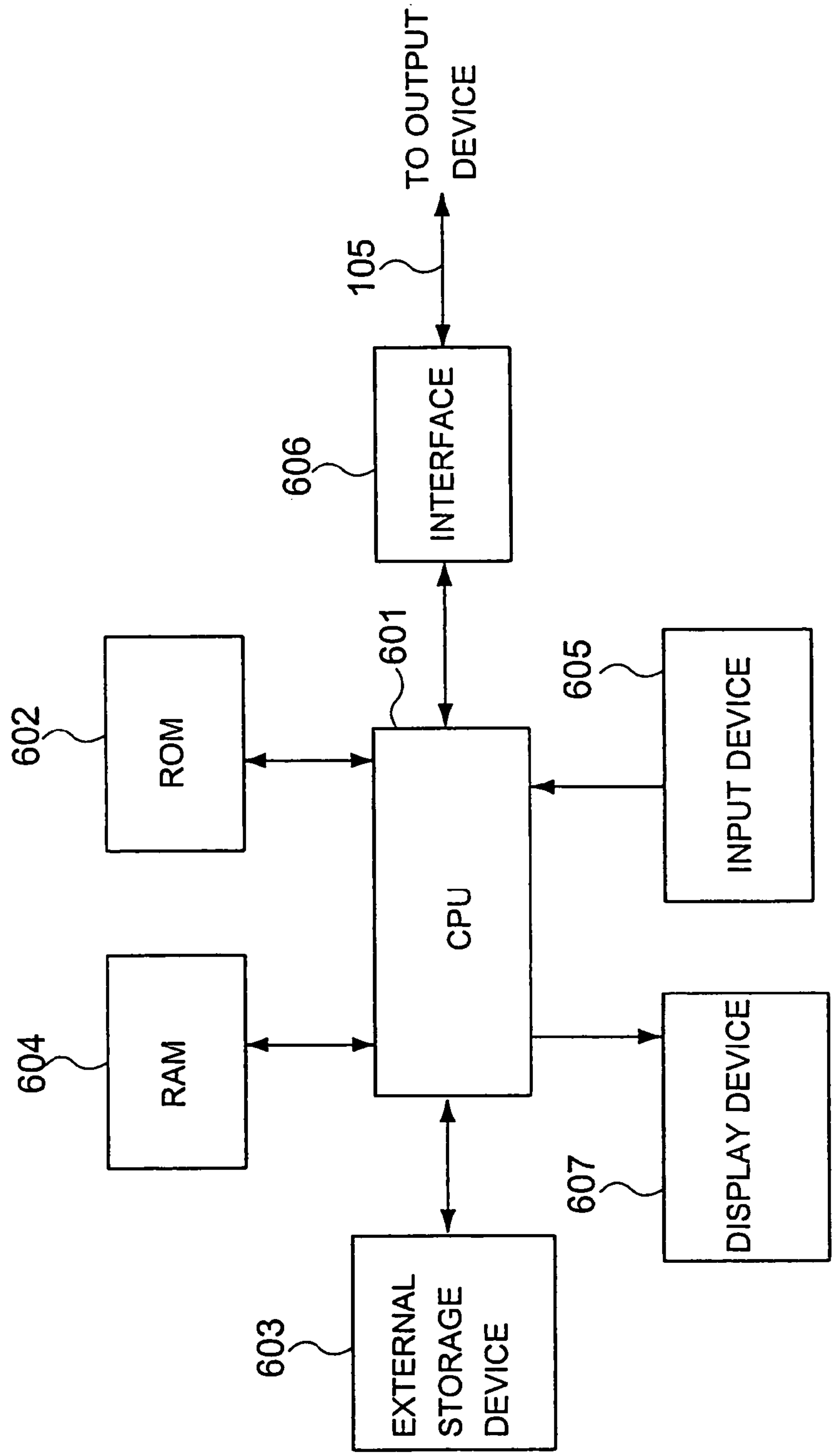
FIG. 5 is a schematic diagram showing the configuration of the host 102 in the output system shown in FIG. 1.

FIG. 5 is a schematic diagram of the host 102 shown in FIG. 1. A CPU 601 controls the various parts of the host 102. When the power is turned on, CPU 601 reads and runs an initial program loader (IPL) stored in ROM 602. As part of the IPL, CPU 601 loads into, and runs from, RAM 604 the operating system or application stored in floppy disk, hard disk, or other external storage device 603.

The operating system or application generates data to be sent to the printer 103, display 104, or other output device according to operator instructions entered using a keyboard, mouse, or other input device 605, and sends the output data to the appropriate output device by way of interface 606. Status information from the output device can also be received through interface 606.

The host 102 commonly has a display device 607 such as a CRT or LCD panel for presenting information, including process results, to the operator. It will be evident to one with ordinary skill in the related art that display 104 can be used as display device 607.

It is thus possible according to a first preferred embodiment of the present invention to save operating parameter values to the nonvolatile memory of the output device, and to load these parameter values as required. It is therefore possible to reduce the amount of data sent from the host, and thereby quickly complete a process for setting the output devices to particular operating environment. The chance that communication errors occur is very low with this technique, making it possible to achieve an extremely reliable output system.

Furthermore, while the amount of communication can be reduced by using the macro capability of the output device, a macro still sets parameters one at a time. Batch setting of parameters using the above-noted customization command can thus better reduce the processing time required to set up a desired operating environment.

Second Embodiment

The second preferred embodiment of the invention differs from the first embodiment described above in the following ways. That is, an output device according to this second preferred embodiment of the present invention has a function for automatically copying parameter values from a predefined PMA 220 in flash ROM 206 to PRAM 205 of RAM 204 when the power is turned on, the output device is reset, or an initialization command is received. This is further described below using printer 103 by way of example as the output device.

When the power is turned on, the printer is reset, or the data interpreted in step S503 (FIG. 4) is an initialization command, printer 103 runs the initialization process based on the program stored in ROM 202. This initialization process includes a memory initialization routine.

Figure 6:
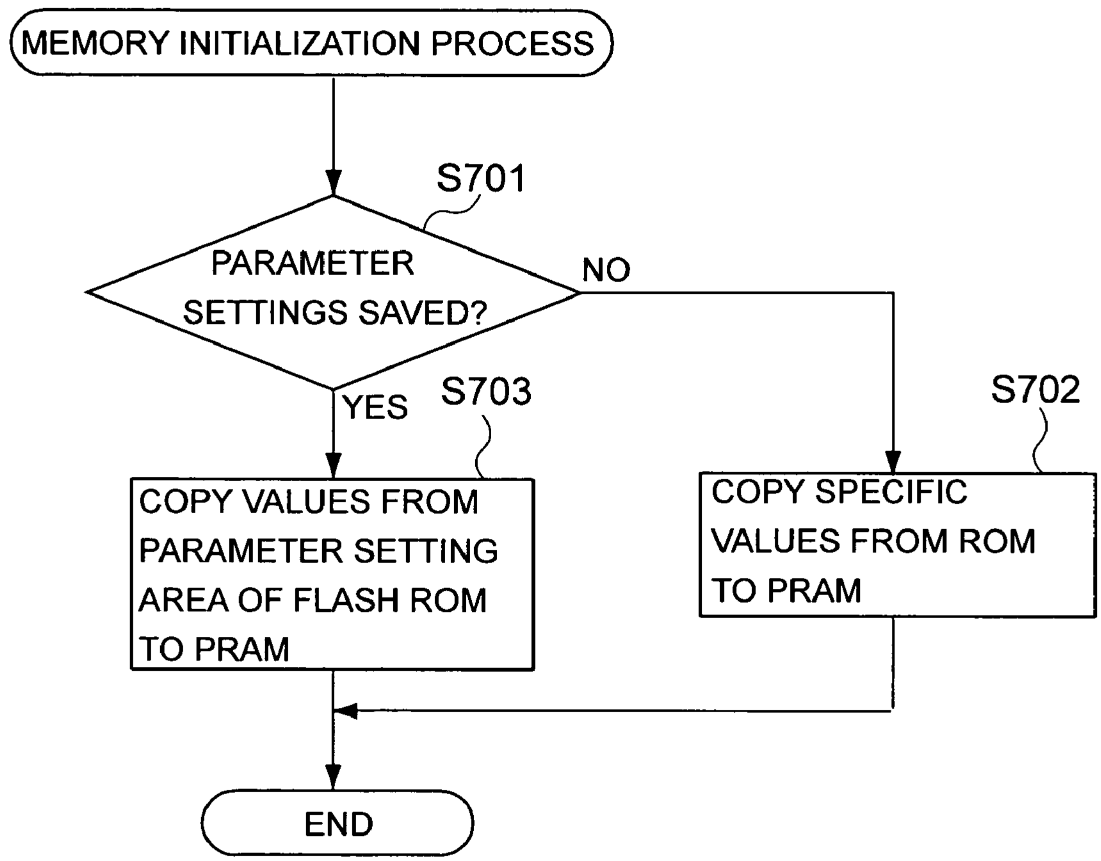
FIG. 6 is a flow chart of the memory initialization process run by an output device according to a second preferred embodiment of the present invention.

A flow chart of this memory initialization process is shown in FIG. 6. When the memory initialization process starts, CPU 201 detects whether parameter values are stored in PMA 220 (S701) (assuming here, there is only one PMA). This can be easily accomplished by, for example, detecting whether flash ROM 206 has been cleared to the default null value. Data is typically deleted from flash ROM 206 by overwriting the data value with a value of 0xff. If this null value 0xff is detected, CPU 201 knows that no parameter values are stored. The integrity of parameter values stored in PMA 220 can be confirmed by, for example, storing a checksum for the values or a CRC (cyclic redundancy check) code in a specific area corresponding to PMA 220.

If no parameter values are stored in PMA 220 (S701 returns no), the preset default values stored in ROM 202 are copied to PRAM 205 (S702), and the memory initialization process ends. It is also possible by reading DIP switch 210 to select from a plurality of default values if DIP switch 210 is used to select one of plural settings.

If parameter values are stored in PMA 220 (S701 returns yes), the values are copied from PMA 220 to PRAM 205 (S703), and the memory initialization process ends.

If there are plural PMA 220 areas in flash ROM 206, the above process can be accomplished by first specifying which PMA 220 to use in the memory initialization process. A particular PMA can be specified using methods such as the following:

(1) the first or another predetermined PMA is used;

(2) checking all PMAs sequentially, starting with the first PMA, as to whether parameter values are stored, and using the first PMA found to have parameter values stored; and (3) predefining the PMA to use in a separate specific area in flash ROM 206, and reading this specific area first.

Technique (3) above can be accomplished by defining a command for specifying the PMA 220 to be used for the memory initialization process. For example, function code n=3 could be defined in the customization command with parameter m used to specify the PMA 220 to be used for the memory initialization process. When such customization command with n=3 is received, the value of command parameter m is stored in that separate specific area in flash ROM 206. In this case, if the command parameter m of the customization command with n=3 was m=0, and the value 0 is thus found in that specific area, step S701 preferably determines that no stored parameter values, if any, from a PMA 220 should be used for the initialization process. In this case the preset factory default values are loaded when the power is turned on.

By thus storing parameter values at a specific address in nonvolatile memory, an output device according to this second embodiment of the present invention can be set to a desired operating environment without sending any data to the output device each time the power is turned on or the output device is reset. Furthermore, stable operation can be assured because the parameter values in PRAM 205 are automatically restored even if output device power is turned off and then on again when unexpected by host 102.

Third Embodiment

An output device according to this third preferred embodiment of the present invention differs from the first embodiment described above in that the output device further has a function for storing parameter values specific to a particular application for each application running on the host. This function can be achieved by modifying the above-described customization command as follows.

That is, the function code passed as parameter n of the customization command is set to n=4. This tells the output device to store the application name in the PMA 220 specified by parameter m. The application name can also be passed as an argument of the customization command. To accomplish this the customization command for printer 103 takes the form:

–0x1d 0x28 0x4d pL pH n m d1 . . . dk where d1 . . . dk is a k-byte application name definition. In this case the number of parameters is (pL+pH*256)=k+2.

It is further possible in this case to tell the output device to send the application name stored to the m-th PMA 220 to the host 102 by setting parameter n of the customization command to n=5.

Figure 7:
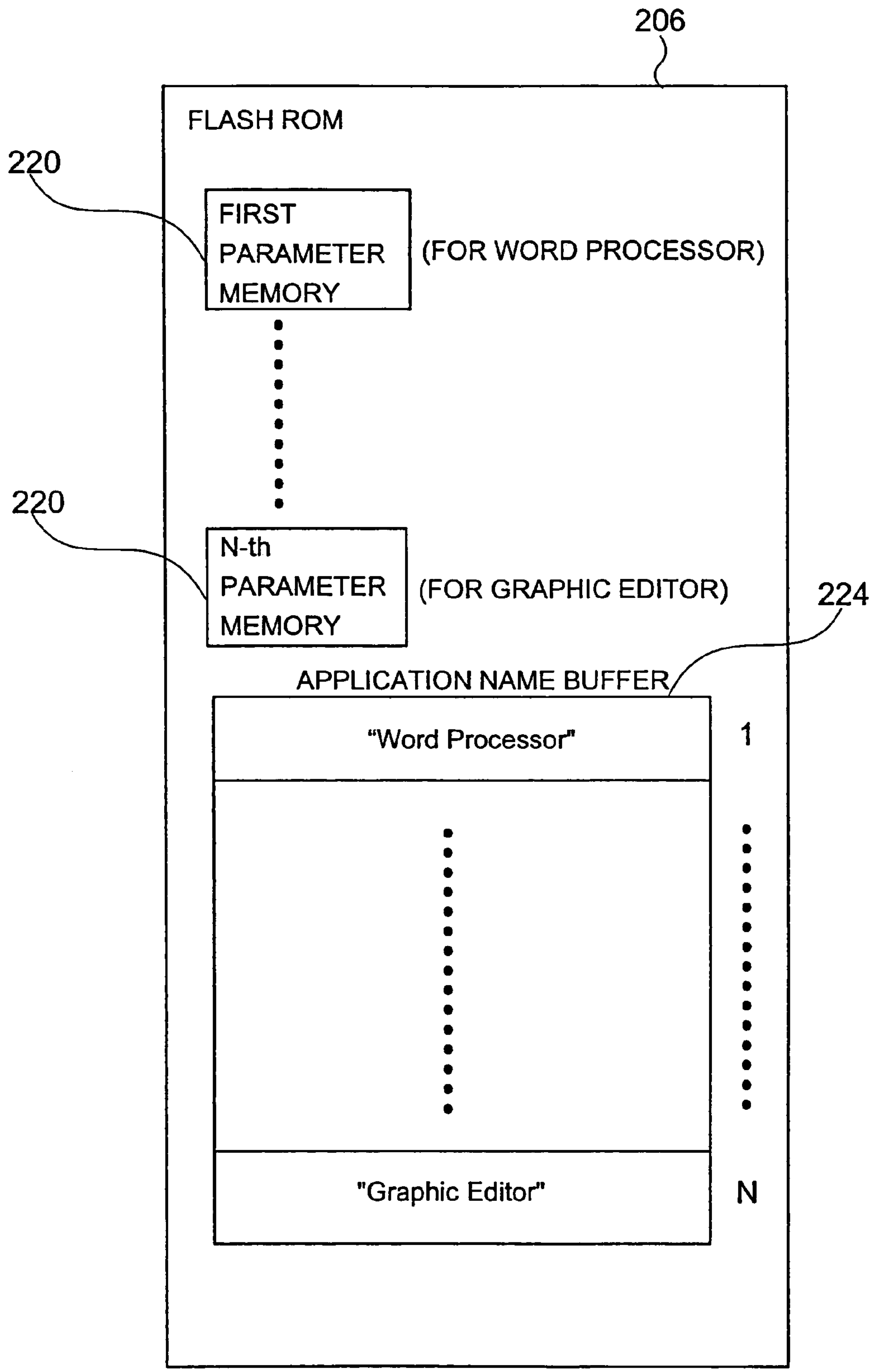
FIG. 7 is a schematic diagram of a flash ROM 206 in an output device according to a third preferred embodiment of the present invention.

FIG. 7 shows a flash ROM 206 having PMAs 220 for storing parameter values for each of plural applications, and an application name buffer 224 for storing the name of the application associated with each of the PMAs 220. Application name buffer 224 has plural elements, and application names are stored as an array of one application name in each element. If there are N PMAs 220, there are also N elements in the application name buffer 224. For example, if the first PMA 220 is allocated to a "word processor," the name of the word processor is stored in the first element of application name buffer 224. Likewise if the N-th PMA 220 is allocated to a "graphic editor," the name of the graphic editor is stored in the N-th element of application name buffer 224.

It will be evident that, alternatively, the application name could be stored together with the parameter values in the same PMA 220.

It will thus be clear that with an output device according to this third embodiment of the present invention the host 102 can manage operating environment settings specific to each of plural applications because the output device (printer 103 in this example) stores the application name with the related set of parameter values in each PMA 220 of flash ROM 206 or in a separate application name buffer with a specific correlation to the PMAs 220, and the host 102 can read the stored application names from the output device.

While the invention has been described in conjunction with several specific embodiments, it will be evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An output device adapted to operate according to data received from a host device, the output device comprising:

a volatile memory that temporarily stores operating parameter values;

a memory initialization processor that initializes the volatile memory in response to a specific input;

a controller that stores operating parameter values into the volatile memory in response to one or more first commands from the host device, and controls the output device based on the operating parameter values stored in the volatile memory;

a first operating parameter controller that saves operating parameter data stored in the volatile memory to a nonvolatile memory in response to a second command from the host device, said operating parameter data comprising one or more operating parameter values;

a second operating parameter controller that stores specific information into the nonvolatile memory in response to a third command from the host device, said specific information being indicative of whether operating parameter data stored in the nonvolatile memory is automatically loaded after the memory initialization process; and a third operating parameter controller that automatically copies said operating parameter data from the nonvolatile memory to the volatile memory after the memory initialization process only when said specific information indicates operating parameter data stored in the nonvolatile memory is automatically loaded.

2. The output device of claim 1, wherein said third operating parameter controller is further adapted to copy said operating parameter data from the nonvolatile memory to the volatile memory in response to a fourth command from the host device.

3. The output device of claim 1, wherein said specific input is one of the power to the output device turning on, a reset signal to reset the output device, or an initialization command from the host device.

4. The output device of claim 1, wherein the nonvolatile memory has a plurality of parameter memory areas for storing respective sets of operating parameter data, and said first operating parameter controller is adapted to save said operating parameter data in one of said parameter memory areas, said one parameter memory area being specified by said second command.

5. The output device of claim 4, wherein said third operating parameter controller is adapted to copy the set of operating parameter data stored in one of said parameter memory areas from the nonvolatile memory to the volatile memory, said one parameter memory area being specified by said specific information.

6. The output device of claim 4, wherein said third operating parameter controller is further adapted to copy the set of operating parameter data stored in one of said parameter memory areas from the nonvolatile memory to the volatile memory in response to a fourth command from the host device, said one parameter memory area being specified by the fourth command.

7. The output device of claim 1, wherein said third operating parameter controller is adapted to write predetermined default operating parameter data into the volatile memory when no operating parameter data is stored in the nonvolatile memory.

8. The output device of claim 1, wherein said third operating parameter controller is responsive to a fifth command from the host device for writing predetermined default operating parameter data into the volatile memory.

9. The output device of claim 1, further comprising a transmitter that reads operating parameter data stored in said nonvolatile memory and sends the read data to the host device in response to a sixth command from the host device.

10. An output device adapted to operate according to data received from a host device, the output device comprising:

a volatile memory that temporarily stores operating parameter values;

a memory initialization processor that initializes the volatile memory in response to a specific input;

a first controller that stores operating parameter values into the volatile memory in response to one or more first commands from the host device, and controls the output device based on the operating parameter values stored in the volatile memory; and a second controller that performs one of the following operations in accordance with a parameter of a second command from the host device, (i) saving operating parameter data stored in the volatile memory to a nonvolatile memory, said operating parameter data comprising one or more operating parameter values;

(ii) storing specific information into the nonvolatile memory, said specific information being indicative of whether operating parameter data stored in the nonvolatile memory is automatically loaded after the memory initialization process;

wherein said second controller is adapted to automatically copy said operating parameter data from the nonvolatile memory to the volatile memory after the memory initialization process only when said specific information indicates operating parameter data stored in the nonvolatile memory is automatically loaded.

11. The output device of claim 10, wherein said operations further includes (iii) copying said operating parameter data stored in the nonvolatile memory to the volatile memory.

12. The output device of claim 10, wherein said specific input is one of the power to the output device turning on, a reset signal to reset the output device, or an initialization command from the host device.

13. The output device of claim 10, wherein the nonvolatile memory has a plurality of parameter memory areas for storing respective sets of operating parameter data, and said second controller is adapted to save operating parameter data from the volatile memory into one of said parameter memory areas, said one of said parameter memory areas being specified by said second command.

14. The output device of claim 13, wherein said second controller is adapted to copy the set of operating parameter data stored in one of said parameter memory areas from the nonvolatile memory to the volatile memory after the memory initialization process, said one of said parameter memory areas being specified by said specific information.

15. The output device of claim 11, wherein the nonvolatile memory has a plurality of parameter memory areas for storing respective sets of operating parameter data, and said second controller is adapted to copy the set of operating parameter data stored in one of said parameter memory areas from the nonvolatile memory to the volatile memory in accordance with the parameter of said second command, said one of said parameter memory areas being specified by the second command.

16. The output device of claim 10, wherein said second controller is adapted to write predetermined default operating parameter data into the volatile memory when no operating parameter data is stored in the nonvolatile memory.

17. The output device of claim 10, wherein said operations further includes (iv) writing predetermined default operating parameter data into the volatile memory.

18. The output device of claim 10, wherein said operations further includes (v) reading operating parameter data stored in said nonvolatile memory and sending the read data to the host device.

19. An output device adapted to operate according to data received from a host device, the output device comprising:

a volatile memory that temporarily stores operating parameter values;

a memory initialization processor that initializes the volatile memory in response to a specific input;

a controller that stores operating parameter values into the volatile memory in response to one or more first commands from the host device, and controls the output device based on the operating parameter values stored in the volatile memory;

wherein said controller is responsive to a second command from the host device for saving operating parameter data stored in the volatile memory to a nonvolatile memory, said operating parameter data comprising one or more operating parameter values;

is responsive to a third command from the host device for storing specific information into the nonvolatile memory, said specific information being indicative of whether operating parameter data stored in the nonvolatile memory is automatically loaded after the memory initialization process; and is adapted to automatically copy said operating parameter data from the nonvolatile memory to the volatile memory after the memory initialization process only when said specific information indicates operating parameter data stored in the nonvolatile memory is automatically loaded.

20. The output device of claim 19, wherein said controller is further responsive to a fourth command from the host device for copying said operating parameter data from the nonvolatile memory to the volatile memory.

* * * * *